US007992072B2

(12) United States Patent
Kubo et al.

(10) Patent No.: US 7,992,072 B2
(45) Date of Patent: Aug. 2, 2011

(54) MANAGEMENT OF REDUNDANCY IN DATA ARRAYS (75) Inventors: Robert Akira Kubo, Tucson, AZ (US);
Kevin Lee Gibble, Tucson, AZ (US);
Matthew Joseph Kalos, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 11/679,120

(22) Filed: Feb. 26, 2007

(65) Prior Publication Data
US 2008/0208930 A1 Aug. 28, 2008

(51) Int. Cl.
*G11C 29/00* (2006.01)
(52) U.S. Cl. .................. 714/770; 714/718; 714/764
(58) Field of Classification Search .................. 714/770, 714/6, 19, 49, 764, 718, 701, 781
See application file for complete search history.

(56) References Cited

U.S. PATENT DOCUMENTS

| | | | | |
|---|---|---|---|---|
| 5,331,646 A | * | 7/1994 | Krueger et al. | 714/766 |
| 5,566,316 A | * | 10/1996 | Fechner et al. | 711/114 |
| 6,269,453 B1 | * | 7/2001 | Krantz | 714/6 |
| 6,289,398 B1 | * | 9/2001 | Stallmo et al. | 710/5 |
| 6,397,293 B2 | | 5/2002 | Shrader et al. | |
| 6,516,425 B1 | | 2/2003 | Belhadj et al. | |
| 6,671,822 B1 | * | 12/2003 | Asher et al. | 714/8 |
| 6,862,703 B2 | * | 3/2005 | Oonk | 714/718 |
| 6,934,804 B2 | * | 8/2005 | Hashemi | 711/114 |
| 7,062,704 B2 | * | 6/2006 | Talagala et al. | 714/819 |
| 7,069,395 B2 | | 6/2006 | Camacho et al. | |

OTHER PUBLICATIONS

Wilkes, et al., "The HP AutoRAID Hierarchical Storage System", ACM Transactions on Computer Systems, vol. 14, No. 1, Feb. 1996, pp. 108-136.
Li, et al., "Securing Information Transmission by Redundancy", ACM, 2000, pp. 112-117.

* cited by examiner

*Primary Examiner* — Fritz Alphonse
(74) *Attorney, Agent, or Firm* — Rabindranath Dutta; Konrad Raynes & Victor LLP (57) ABSTRACT Provided are a method, system, and article of manufacture, wherein a determination is made that a first data array in a plurality of data arrays has to be repaired to replace a failed storage device within the first data array. A storage device is selected from a selected data array of the plurality of data arrays to replace the failed storage device, wherein a data value corresponding to the selected data array is less than the data value corresponding to the first data array.

24 Claims, 4 Drawing Sheets

MANAGEMENT OF REDUNDANCY IN DATA ARRAYS

BACKGROUND

1. Field

The disclosure relates to a method, system, and article of manufacture for the management of redundancy in data arrays.

2. Background

Certain information technology storage systems may provide high availability and reliability via implementation that provide redundancy. Fault tolerance may be achieved in such storage systems via redundant fault tolerant hardware designs in which user data may be stored in arrays of storage devices configured in a Redundant Arrays of Inexpensive Disks (RAID) scheme. Certain RAID schemes (e.g., RAID levels 1, 2, 3, 4, 5, 10 [0+1, 1+01]) provide a single level of redundant protection and are tolerant of a single device failure, wherein failures of additional devices may potentially cause data to be lost.

Online RAID array repair, also known as hot sparing, may be used to restore RAID array redundancy following a failure of a storage device. During the online array repair, the RAID array may be in a rebuilding state and may remain susceptible to additional failures that result in an unrecoverable data loss. The advancements in the pace of storage device capacity growth may have caused the amount of data at risk in any single storage array to reach levels where the statistical probability of data loss events may make it difficult to attain the desired fault tolerance in high availability storage systems.

Additionally, certain storage system solutions provide high capacity low cost storage devices [e.g., Serial ATA (SATA), Fibre Attached Technology Adapted (FATA)] which typically have lower reliability characteristics than server class devices [e.g., Fibre Channel-Arbitrated Loop (FC-AL), Small Computer Systems Interface (SCSI), Serial Attached SCSI (SAS), Serial Storage Architecture (SSA)] with larger capacity per device, and such high capacity low cost storage devices may further exacerbate the faults in single redundant RAID levels. "Advanced RAID levels" (e.g., RAID 51, RAID 6, RAID 3+3, RAID N+3) are designed to tolerate multiple storage device failures to restore a balance between fault tolerance and RAID system data protection.

SUMMARY OF THE PREFERRED EMBODIMENTS

Provided are a method, system, and article of manufacture, wherein a determination is made that a first data array in a plurality of data arrays has to be repaired to replace a failed storage device within the first data array. A storage device is selected from a selected data array of the plurality of data arrays to replace the failed storage device, wherein a data value corresponding to the selected data array is less than the data value corresponding to the first data array.

In certain embodiments, the data values represent the relative values of data stored in the plurality of data arrays.

In further embodiments, the data value corresponding to the selected data array is the least data value among all data arrays that are capable of lending storage devices to the first data array.

In certain additional embodiments, the selecting of the storage device from the selected data array is performed in response to determining that an attribute corresponding to the first data array indicates that the first data array is able to borrow at least one storage device from other data arrays of the plurality of data arrays.

In further embodiments, the selected data array has at least one corresponding attribute that indicates that the selected data array allows one or more storage devices to be borrowed from the selected data array, wherein the selecting of the storage device from the selected data array of the plurality of data arrays to replace the failed storage device is performed in response to determining that no hot spare storage device is available to replace the failed storage device.

In yet further embodiments, each of the plurality of data arrays are Redundant Array of Independent Disks (RAID), wherein a storage controller is coupled to the plurality of data arrays, wherein for each data array in the plurality of data arrays the following are maintained: (i) a first attribute that represents a relative value of the data stored in the data array to a user; (ii) a second attribute that represents whether the data array is capable of borrowing one or more storage devices from other data arrays in the plurality of data arrays; and (iii) a third attribute that represents whether the data array is capable of lending one or more storage devices to the other data arrays in the plurality of data arrays.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

"Advanced RAID Levels" and Redundancy

Implementations of advanced RAID levels may cause additional storage capacity overhead because additional dimensions of parity protection may increase the parity capacity overhead that may be needed to store the additional redundancy data. Since many storage systems are priced based upon storage capacity this may result in an increased cost to the end user.

Existing RAID levels that provide hot spare online RAID array repair facilities may need eligible spare storage devices to be available in order to be effective. This may further increase the system overhead capacity and impact the cost of storage for the end user.

Additionally, it is possible that not all data has equal value to the user and thus data of different value may not have the same redundancy requirements. It is possible that storage systems that support the advanced RAID levels may not configure all of the storage under the system in an advanced RAID level because of the potential cost overheads for the additional capacity. It is also possible that with the increased redundancy of the advanced RAID levels and the increased overhead capacity costs, certain users may choose to configure fewer "hot spare" devices to control system costs. Thus, even with the advanced RAID levels, the susceptibility to data loss events from single redundant RAID levels may remain and may actually increase in probability if the user chooses to configure fewer overall hot spare devices in the system.

Exemplary Embodiments

Certain embodiments provide fault tolerance, i.e., redundancy, to RAID arrays that have experienced storage device failures by taking into consideration the factors associated with the value that the user places on the data being protected. Certain embodiments also allow for the control of the cost overheads of redundant capacity.

Certain embodiments selectively restore redundancy to RAID arrays that have experienced failures that may result in a susceptibility to data loss from an additional failure in storage devices, wherein no available hot spare devices are available to perform an online repair. Certain embodiments use the multiple dimensions of RAID array redundancy of the advanced RAID levels to provide candidate devices for conducting online repairs to restore redundancy to a RAID array that has lost its redundancy for some reason.

Furthermore, certain embodiments allow a user to indicate a relative value of the data on an array and allow the system to determine when it is appropriate to remove a level of redundancy from a multi redundant RAID array to restore redundancy to an array that is susceptible to data loss from an additional failure. In certain embodiments, values are assigned to each RAID array, and the values are used to determine when it is appropriate to "take" a device from a multi-redundant RAID array to perform an online repair of non-redundant RAID array.

Figure 1:
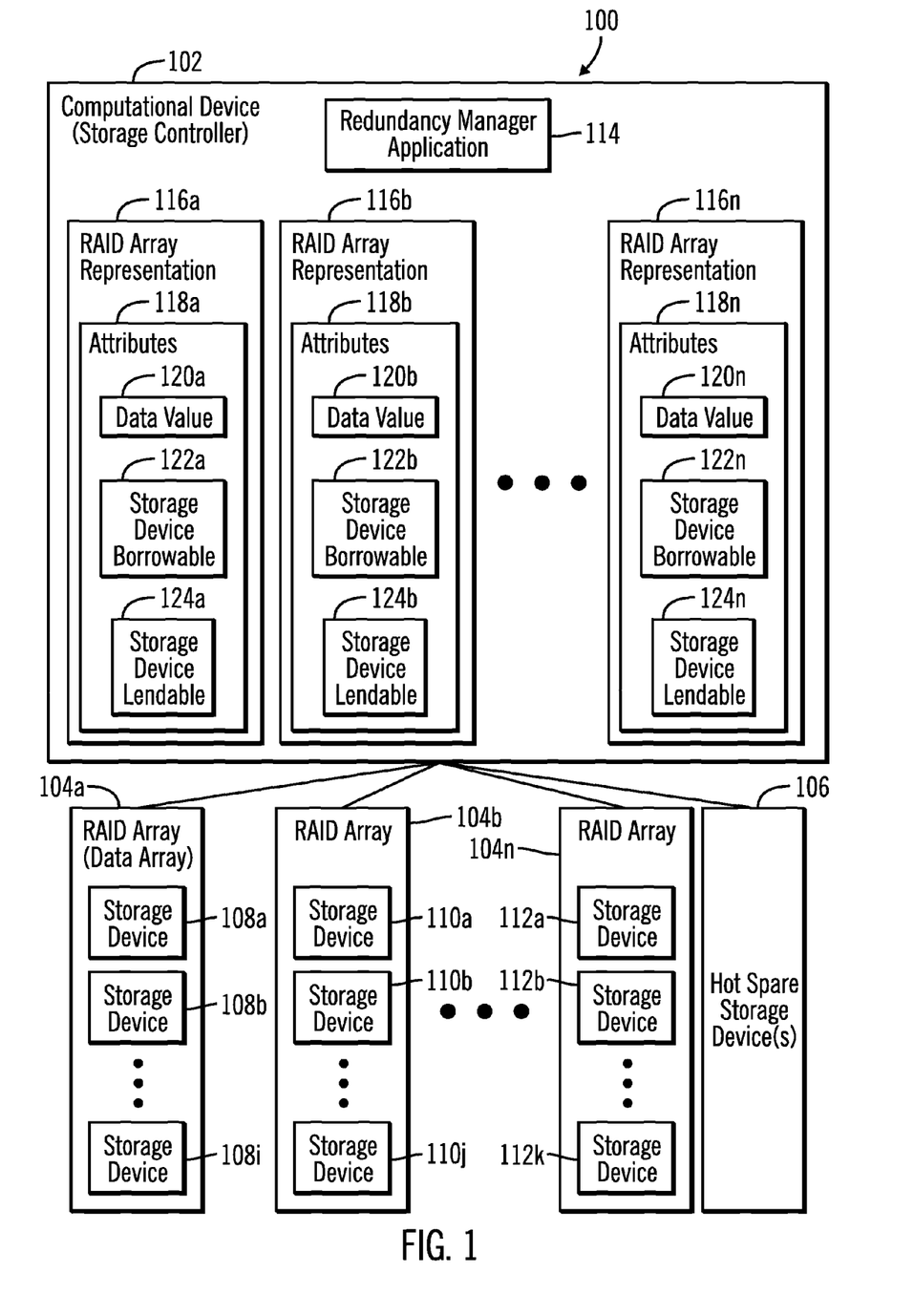
FIG. 1 illustrates a block diagram of a computing environment, in accordance with certain embodiments.

FIG. 1 illustrates a block diagram of a computing environment 100, in accordance with certain embodiments. In the computing environment 100, a computational device 102, such as a storage controller, is coupled to a plurality of data arrays 102a, 104b, . . . 104n, where the data arrays 104a . . . 104n may comprise any storage arrays, such, as RAID arrays 104a . . . 104n. While in FIG. 1, the computational device 102 has been shown to be a storage controller, in alternative embodiments, the computational device 102 may comprise any suitable computational device known in the art. In addition to the RAID arrays 104a . . . 104n the computational device 102 may also be coupled to one or more hot spare storage devices 106, where the hot spare storage device 106 may comprise any suitable storage devices known in the art, such as, disk drives, optical drives, etc.

Each of the RAID arrays 104a . . . 104n may include one or more storage devices, such as RAID disks. For example, RAID array 104a may include storage device 108a, 108b, . . . , 108i. RAID array 104b may include storage devices 110a, 100b, . . . 110j, and RAID array 104n may include storage devices 112a, 112b, . . . , 112k.

The storage controller 102 may comprise a redundancy manager application 114 that may be implemented in software, hardware, or any combination thereof. The storage controller 102 also maintains data structures, referred to as RAID array representations 116a, 116b, . . . 116n that store characteristics of the RAID arrays 104a . . . 104n coupled to the storage controller 102. The RAID array representations 116a, 116b, . . . 116n include attributes 118a, 118b, . . . 118n of the RAID arrays 104a . . . 104n coupled to the storage controller 102. The attributes 118a, 118b, . . . 118n comprise data values 120a, 120b, . . . 120n, indicators 122a, 122b, . . . 122n that indicate whether a storage device can be borrowed by a RAID array, and indicators 124a, 124b, . . . 124n that indicate whether a storage device can be lent from a RAID array.

The data values 120a, 120b, . . . 120n indicate a relative value, i.e., importance, of the data stored in the corresponding RAID array. For example, data value 120b indicates the relative value of the data stored in the RAID array 104b. In certain embodiments, the data values 120a . . . 120n may be indicated by a user. In alternative embodiments, the data values 104a . . . 104n may be computed by a computer program based on various factors, such as, cost, performance, capacity, physical location, frequency of usage, RAID types, etc., of disk drives. In different embodiments the data values 104a . . . 104n may be based on different factors. The redundancy manager application 114 uses the attributes 118a . . . 118n to manage redundancy in the RAID arrays 104a . . . 104n. While in certain embodiments data values may be defined as the relative values of data stored in the plurality of data arrays, in other embodiments data values may defined differently.

Therefore, FIG. 1 illustrates certain embodiments in which a redundancy manager application 114 may repair a RAID array that has lost all redundancy by borrowing at least one storage device from another RAID array that has redundancy, wherein the borrowing of the at least one storage device is based on attributes 118a . . . 118n that are maintained for the RAID arrays 116a . . . 116n. The attributes 118a . . . 118n include data values 120a . . . 120n that store the relative value of the data stored in each of the RAID arrays 116a . . . 116n.

Figure 2:
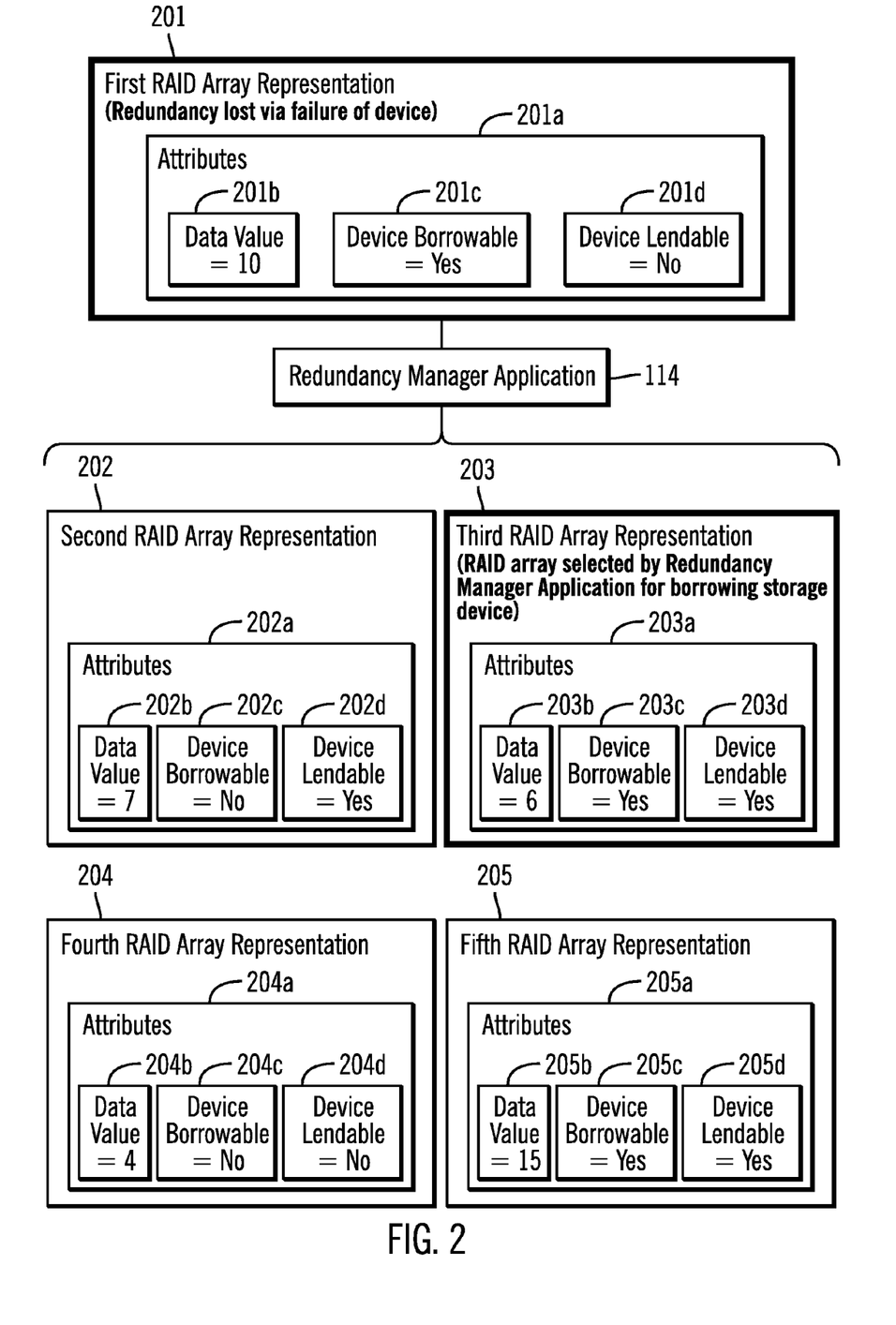
FIG. 2 illustrates a block diagram of RAID array representations, in accordance with certain embodiments.

FIG. 2 illustrates a block diagram of RAID array representations 201, 202, 203, 204, 205, in accordance with certain embodiments. In certain exemplary embodiments the RAID array representations may be implemented the storage controller 102 and may represent RAID arrays 104a . . . 104n that are coupled to the storage controller 102. For example, the first RAID array representation 201 may represent a first RAID array, such as RAID array 104a, the second RAID array representation 202 may represent a second RAID array, such as RAID array 104b, and so on. The RAID array representations 201, 202, 203, 204, 205 of FIG. 2 may in certain embodiments correspond to the RAID array representations 116a . . . 116n shown in FIG. 1.

FIG. 2 also illustrates the attributes 201a, 202a, 203a, 204a, 205a of the RAID arrays 201, 202, 203, 204, 205, where the attributes 201a, 202a, 203a, 204a, 205a in FIG. 2 are shown to include exemplary values of the data values 201b, 202b, 203b, 204b, 205b, exemplary values of the device borrowable indicators 201c, 202c, 203c, 204c, 205c and exemplary values of the device lendable indicators 201d, 202d, 203d, 204d, 205d.

In FIG. 2 if redundancy is lost in the first RAID array via the failure of a storage device included in the first RAID array, then the redundancy manager application 114 may determine from the first RAID array representation 201 that the device borrowable indicator 201c is "Yes", implying that a storage device may be borrowed by the first RAID array to replace the lost device.

The redundancy manager application 114 may borrow a storage device from the third RAID array into the first RAID array because the device lendable indicator 203c of the third RAID array representation 203 is "Yes", i.e., device can be lent by the third RAID array, and the data value 203b of the third RAID array representation 203 is "2" which is less than the data value 201b of the first RAID array representation 201, where the data value 201b of the first RAID array representation 201 is "10".

Therefore, FIG. 2 illustrates certain embodiments in which, in response to a failure of a storage device in the first RAID array, the redundancy manager application 114, selects the third RAID array that has the lowest data value and allows lending of a storage device, and borrows a storage device from the third RAID array to repair the first RAID array that has lost all redundancy.

Figure 3:
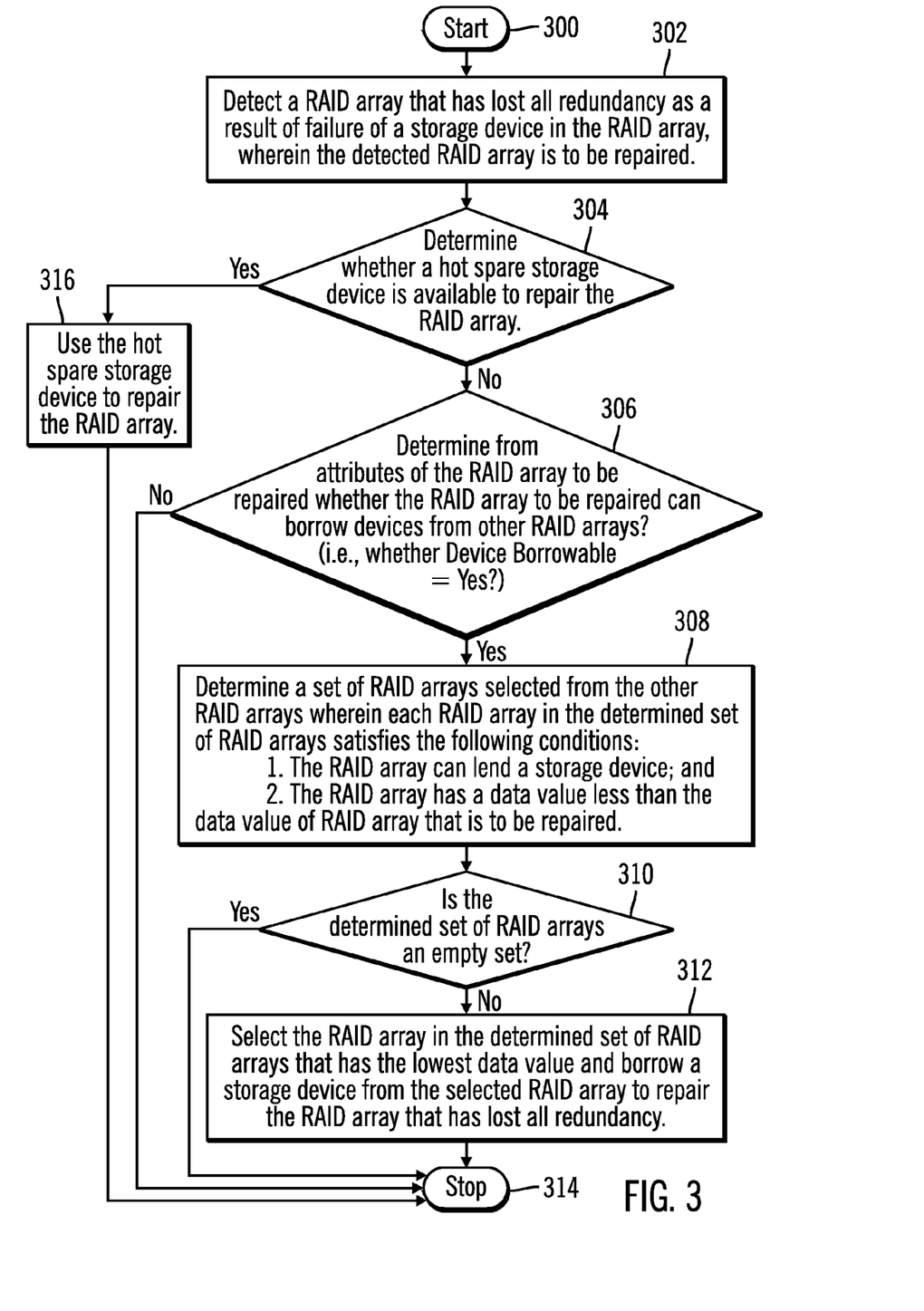
FIG. 3 illustrates operations for managing redundancy in RAID arrays, in accordance with certain embodiments.

FIG. 3 illustrates operations for managing redundancy in RAID arrays, in accordance with certain embodiments. The operations illustrated in FIG. 3 may be implemented by the redundancy manager application 114 implemented in the storage controller 102 of the computing environment 100.

Control starts at block 300, and the redundancy manager application 114 detects (at block 302) a first RAID array that has lost all redundancy as a result of failure of a storage device in the first RAID array, wherein the detected first RAID array is to be repaired. The redundancy manager application 114 determines (at block 304) whether a hot spare storage device 106 is available to repair the first RAID array. If not, then the redundancy manager application 114 determines (at block 306) from attributes 201a of the RAID array to be repaired whether the RAID array to be repaired can borrow devices from other RAID arrays, i.e., whether Device Borrowable indicator 201c is "Yes".

If the redundancy manager application 114 determines that the RAID array to be repaired can borrow devices from other RAID arrays then the redundancy manager application 114 determines (at block 308) a set of RAID arrays selected from the other RAID arrays, wherein each RAID array in the determined set of RAID arrays satisfies the following conditions:
1. The RAID array can lend a storage device (i.e., device lendable indicator is "Yes"); and
2. The RAID array has a data value less than the data value of RAID array that is to be repaired.

The redundancy manager application 114 determines (at block 310) if the determined set of RAID arrays an empty set. If not, the redundancy manager application 114 selects (at block 312) the RAID array in the determined set of RAID array, where the selected RAID array has the lowest data value, and then the redundancy manager application 114 borrows a storage device from the selected RAID array to repair the RAID array that has lost all redundancy. Control proceeds to block 314 where the process stops.

If at block 304, the redundancy manager application 114 determines that a hot spare storage device 106 is available to repair the first RAID array then control proceeds to block 316, where the redundancy manager application 114 uses the hot spare device to repair the first RAID array and the process stops (at block 314).

If at block 306, the redundancy manager application 114 determines from attributes 201a of the RAID array to be repaired that the RAID array to be repaired cannot borrow devices from other RAID arrays, the process stops (at block 314).

If at block 310, the redundancy manager application 114 determines that the determined set of RAID arrays an empty set, the process stops (at block 314).

Therefore, FIG. 3 illustrates certain embodiments in which a determination is made that a first RAID array of a plurality of RAID arrays has to be repaired to replace a failed storage device within the first RAID array. A storage device is selected from a selected RAID array of the plurality of RAID arrays to replace the failed storage device, wherein a data value corresponding to the selected RAID array is less than the data value corresponding to the first RAID array, wherein the data value corresponding to the selected RAID array is the least data value among all RAID arrays that are capable of lending storage devices to the first data array, and wherein data values represent relative values of data stored in the plurality of RAID arrays to a user.

In certain embodiments, for multi-redundant array types, such as RAID arrays with multiple dimensions of redundancy and therefore fault tolerance (e.g., RAID 6), the user may make a decision regarding the value of the data that is to be stored on each of the RAID arrays. The user may also assign attributes to the RAID arrays of the system, where the attributes may be used to determine the policies associated with the determination of candidate storage devices for online repair of a RAID array. The attributes may include indicators that allow the system to determine:
1. If it is allowable to take a device from the RAID array to perform an online repair of another RAID array that has lost redundancy because of a failure;
2. A relative value of the data to be stored on the RAID array; and
3. If the RAID array is eligible to have its redundancy restored from the taking of a device from another multi-redundant RAID array when the RAID array has lost all redundancy.

In certain other embodiments, for single redundant array types, the user may make a decision regarding the value of the data that is to be stored on the RAID array. The user may assign attributes to the RAID array, where the attributes may be used by the system to determine the policies associated with using candidates from multi-redundant arrays to perform online repair of the array when the array has lost redundancy. The attributes may include indicators that allow the system to determine:
1. The relative value of the data to be stored on the RAID array; and
2. If the array is eligible to have its redundancy restored from the taking of a device from another multi-redundant RAID array when it has lost all redundancy.

Certain embodiments use the attributes assigned to the multi-redundant and single redundant arrays to determine the policy to use for online RAID array repair when a storage device failure results in a RAID array losing all redundancy. In certain embodiments, the restoration of redundancy of a multi-redundant array is managed by the repair process by using the system policy for repair management and via the replacement of storage devices.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purpose of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system for apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiment", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 4:
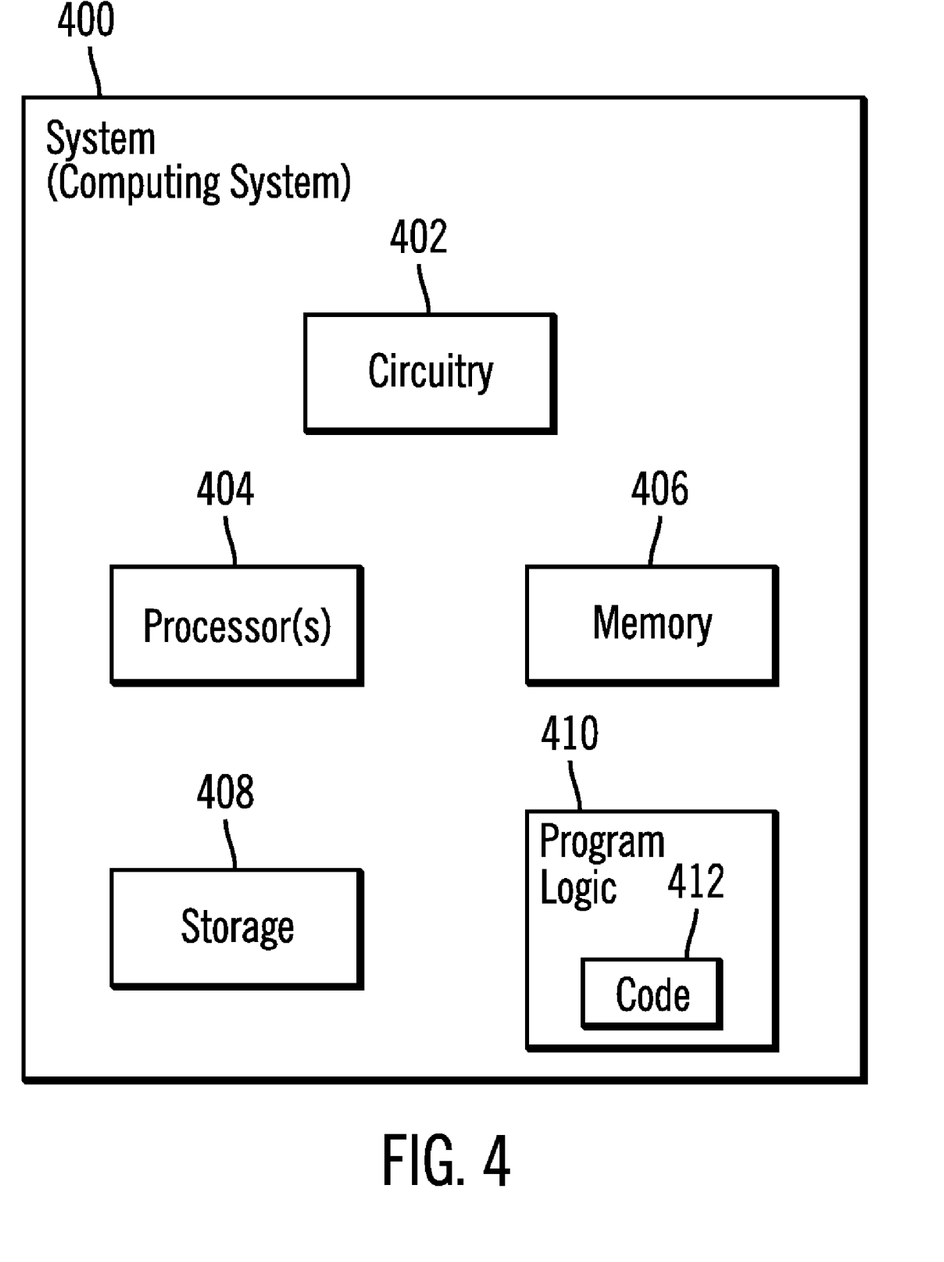
FIG. 4 illustrates a block diagram of a computer architecture in which certain described aspects of the embodiments are implemented.

FIG. 4 illustrates the architecture of computing system 400, wherein in certain embodiments the computational device 102a of the computing environment 100 of FIG. 1 may be implemented in accordance with the architecture of the computing system 400. The computing system 400 may also be referred to as a system, and may include a circuitry 402 that may in certain embodiments include a processor 404. The system 400 may also include a memory 406 (e.g., a volatile memory device), and storage 408. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Certain embodiments may be directed to a method for deploying computing instruction by a person or automated processing integrating computer-readable code into a computing system, wherein the code in combination with the computing system is enabled to perform the operation of the described embodiments.

At least certain of the operations illustrated in FIGS. 1-4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

determining, by a processor coupled to a memory, that a first data array in a plurality of data arrays coupled to the memory has to be repaired to replace a failed storage device within the first data array; and selecting, by the processor, a storage device from a selected data array of the plurality of data arrays to replace the failed storage device, wherein a data value corresponding to the selected data array is less than the data value corresponding to the first data array, and wherein data values represent relative values of data stored in the plurality of data arrays.

2. The method of claim 1, wherein the data value corresponding to the selected data array is the least data value among all data arrays that are capable of lending storage devices to the first data array.

3. The method of claim 2, wherein the selecting of the storage device from the selected data array is performed in response to determining that an attribute corresponding to the first data array indicates that the first data array is able to borrow at least one storage device from other data arrays of the plurality of data arrays.

4. The method of claim 3, wherein the selected data array has at least one corresponding attribute that indicates that the selected data array allows one or more storage devices to be borrowed from the selected data array, and wherein the selecting of the storage device from the selected data array of the plurality of data arrays to replace the failed storage device is performed in response to determining that no hot spare storage device is available to replace the failed storage device.

5. The method of claim 1, wherein each of the plurality of data arrays are Redundant Array of Independent Disks (RAID), wherein a storage controller is coupled to the plurality of data arrays, the method further comprising:

maintaining, in the storage controller, for each data array in the plurality of data arrays:

(i) a first attribute that represents a relative value of the data stored in the data array to a user;

(ii) a second attribute that represents whether the data array is capable of borrowing one or more storage devices from other data arrays in the plurality of data arrays; and (iii) a third attribute that represents whether the data array is capable of lending one or more storage devices to the other data arrays in the plurality of data arrays.

6. The method of claim 1, the method further comprising:

maintaining, for each data array in the plurality of data arrays:

(i) a first attribute that represents a relative value of the data stored in the data array to a user;

(ii) a second attribute that represents whether the data array is capable of borrowing one or more storage devices from other data arrays in the plurality of data arrays; and (iii) a third attribute that represents whether the data array is capable of lending one or more storage devices to the other data arrays in the plurality of data arrays.

7. A system, comprising:

memory;

a plurality of data arrays coupled to the memory; and a processor coupled to the memory, wherein the processor performs operations, the operations comprising:

(i) determining that a first data array in the plurality of data arrays has to be repaired to replace a failed storage device within the first data array; and (ii) selecting a storage device from a selected data array of the plurality of data arrays to replace the failed storage device, wherein a data value corresponding to the selected data array is less than the data value corresponding to the first data array, wherein data values represent relative values of data stored in the plurality of data arrays.

8. The system of claim 7, wherein the data value corresponding to the selected data array is the least data value among all data arrays that are capable of lending storage devices to the first data array.

9. The system of claim 8, wherein the selecting of the storage device from the selected data array is performed in response to determining that an attribute corresponding to the first data array indicates that the first data array is able to borrow at least one storage device from other data arrays of the plurality of data arrays.

10. The system of claim 9, wherein the selected data array has at least one corresponding attribute that indicates that the selected data array allows one or more storage devices to be borrowed from the selected data array, and wherein the selecting of the storage device from the selected data array of the plurality of data arrays to replace the failed storage device is performed in response to determining that no hot spare storage device is available to replace the failed storage device.

11. The system of claim 7, wherein each of the plurality of data arrays are Redundant Array of Independent Disks (RAID), the system further comprising:

a storage controller coupled to the plurality of data arrays, wherein the storage controller maintains, for each data array in the plurality of data arrays:

(i) a first attribute that represents a relative value of the data stored in the data array to a user;

(ii) a second attribute that represents whether the data array is capable of borrowing one or more storage devices from other data arrays in the plurality of data arrays; and (iii) a third attribute that represents whether the data array is capable of lending one or more storage devices to the other data arrays in the plurality of data arrays.

12. The system of claim 7, the operations further comprising:

maintaining, for each data array in the plurality of data arrays:

(i) a first attribute that represents a relative value of the data stored in the data array to a user;

(ii) a second attribute that represents whether the data array is capable of borrowing one or more storage devices from other data arrays in the plurality of data arrays; and (iii) a third attribute that represents whether the data array is capable of lending one or more storage devices to the other data arrays in the plurality of data arrays.

13. An article of manufacture, wherein the article of manufacture is capable of causing operations on a computer, the operations comprising:

determining, by a processor coupled to a memory, that a first data array in a plurality of data arrays coupled to the memory has to be repaired to replace a failed storage device within the first data array; and selecting, by the processor, a storage device from a selected data array of the plurality of data arrays to replace the failed storage device, wherein a data value corresponding to the selected data array is less than the data value corresponding to the first data array, wherein data values represent relative values of data stored in the plurality of data arrays.

14. The article of manufacture of claim 13, wherein the data value corresponding to the selected data array is the least data value among all data arrays that are capable of lending storage devices to the first data array.

15. The article of manufacture of claim 14, wherein the selecting of the storage device from the selected data array is performed in response to determining that an attribute corresponding to the first data array indicates that the first data array is able to borrow at least one storage device from other data arrays of the plurality of data arrays.

16. The article of manufacture of claim 15, wherein the selected data array has at least one corresponding attribute that indicates that the selected data array allows one or more storage devices to be borrowed from the selected data array, and wherein the selecting of the storage device from the selected data array of the plurality of data arrays to replace the failed storage device is performed in response to determining that no hot spare storage device is available to replace the failed storage device.

17. The article of manufacture of claim 13, wherein each of the plurality of data arrays are Redundant Array of Independent Disks (RAID), wherein a storage controller is coupled to the plurality of data arrays, the method further comprising:
   maintaining, in the storage controller, for each data array in the plurality of data arrays:
   (i) a first attribute that represents a relative value of the data stored in the data array;
   (ii) a second attribute that represents whether the data array is capable of borrowing one or more storage devices from other data arrays in the plurality of data arrays; and
   (iii) a third attribute that represents whether the data array is capable of lending one or more storage devices to the other data arrays in the plurality of data arrays.

18. The article of manufacture of claim 13, the operations further comprising:
   maintaining, for each data array in the plurality of data arrays:
   (i) a first attribute that represents a relative value of the data stored in the data array to a user;
   (ii) a second attribute that represents whether the data array is capable of borrowing one or more storage devices from other data arrays in the plurality of data arrays; and
   (iii) a third attribute that represents whether the data array is capable of lending one or more storage devices to the other data arrays in the plurality of data arrays.

19. A method for deploying computing infrastructure, comprising integrating computer-readable code into a computer, wherein the code in combination with the computer is capable of performing:
   determining, by a processor coupled to a memory, that a first data array in a plurality of data arrays coupled to the memory has to be repaired to replace a failed storage device within the first data array; and
   selecting, by the processor, a storage device from a selected data array of the plurality of data arrays to replace the failed storage device, wherein a data value corresponding to the selected data array is less than the data value corresponding to the first data array, wherein data values represent relative values of data stored in the plurality of data arrays.

20. The method for deploying computing infrastructure of claim 19, wherein the data value corresponding to the selected data array is the least data value among all data arrays that are capable of lending storage devices to the first data array.

21. The method for deploying computing infrastructure of claim 20, wherein the selecting of the storage device from the selected data array is performed in response to determining that an attribute corresponding to the first data array indicates that the first data array is able to borrow at least one storage device from other data arrays of the plurality of data arrays.

22. The method for deploying computing infrastructure of claim 21, wherein the selected data array has at least one corresponding attribute that indicates that the selected data array allows one or more storage devices to be borrowed from the selected data array, and wherein the selecting of the storage device from the selected data array of the plurality of data arrays to replace the failed storage device is performed in response to determining that no hot spare storage device is available to replace the failed storage device.

23. The method for deploying computing infrastructure of claim 19, wherein each of the plurality of data arrays are Redundant Array of Independent Disks (RAID), wherein a storage controller is coupled to the plurality of data arrays, wherein the storage controller maintains for each data array in the plurality of data arrays:
   (i) a first attribute that represents a relative value of the data stored in the data array to a user;
   (ii) a second attribute that represents whether the data array is capable of borrowing one or more storage devices from other data arrays in the plurality of data arrays; and
   (iii) a third attribute that represents whether the data array is capable of lending one or more storage devices to the other data arrays in the plurality of data arrays.

24. The method for deploying computing infrastructure of claim 19, wherein the code in combination with the computer is further capable of performing:
   maintaining, for each data array in the plurality of data arrays:
   (i) a first attribute that represents a relative value of the data stored in the data array to a user;
   (ii) a second attribute that represents whether the data array is capable of borrowing one or more storage devices from other data arrays in the plurality of data arrays; and
   (iii) a third attribute that represents whether the data array is capable of lending one or more storage devices to the other data arrays in the plurality of data arrays.

* * * * *